United States Patent Office 2,860,032
Patented Nov. 11, 1958

2,860,032

WET METHOD OF PREPARING PLUTONIUM TRIBROMIDE

Norman R. Davidson, Sierra Madre, Calif., and Earl K. Hyde, Chicago, Ill., assignors to the United States of America as represented by the United States Atomic Energy Commission No Drawing. Application December 31, 1947
Serial No. 795,136

6 Claims. (Cl. 23—14.5)

This invention relates to the preparation of plutonium tribromide, and more particularly to the preparation of plutonium tribromide in the anhydrous form from solution containing either tetravalent or trivalent plutonium.

An object of this invention is to provide a method for the preparation of the tribromide of plutonium from aqueous solutions containing tetravalent plutonium.

A further object is to provide a method whereby plutonium tribromide in both the hydrated and anhydrous forms can be prepared from aqueous acid solutions containing plutonium.

Other objects and advantages will become apparent on further examination of this specification.

In accordance with the process of this invention plutonium tribromide is prepared from aqueous acid solutions containing plutonium tetrabromide by heating and drying the latter solution in the presence of an excess of bromide anions. The presence of bromide anions in excess simultaneously effects reduction of tetravalent plutonium in aqueous solutions to trivalent plutonium and prevents hydrolysis of the resultant plutonium tribromide to plutonium oxybromide during the drying process consisting of the evaporation of the plutonium-containing solutions and the dehydration of the resultant compounds.

Bromide anions are incorporated in the aqueous plutonium-containing solutions in excess sufficient to furnish the requisite oxidation-reduction potential, which, in this case, must be substantially more positive than the standard oxidation-reduction potential for the tetravalent-trivalent plutonium couple, i. e., it must be more positive than −0.966 volt. Materials suitable for incorporation in such an aqueous system in order to furnish the bromide anions necessary to provide the more positive oxidation-reduction potential are: gaseous hydrogen bromide, a concentrated aqueous solution of hydrogen bromide, or a volatile bromide salt, such as ammonium bromide. An excess of bromide anions may be furnished by dissolving a tetravalent plutonium compound, such as the tetrahydroxide or an oxide of plutonium, in a concentrated (5 M) solution of hydrogen bromide. When a volatile bromine-containing compound, such as ammonium bromide, is used, about a six-fold excess is preferred in order to insure adequate reduction of the tetravalent plutonium in solution. This compound must be removed by volatilization during the drying and isolation of the desired product. Hydrogen bromide is the preferred reducing agent for the process of this invention, since by the use of this compound no impurities are introduced which necessitate removal before obtaining a pure compound.

When the tetravalent plutonium, present in solution as the bromide is heated to 70° C. in the presence of an excess of bromide anions, the plutonium is reduced to the trivalent state simultaneously with the liberation of bromine, which boils out of the solution at this temperature. Such a reaction is represented by the following equation:

$$Pu(IV) + Br^- \rightarrow Pu(III) + \tfrac{1}{2}Br_2$$

In a further embodiment of this invention anhydrous plutonium tribromide is prepared by evaporating a solution containing either plutonium tribromide or plutonium tetrabromide to dryness in a stream of hydrogen bromide and heating the resultant hydrated product residue at a substantially elevated temperature in the continued presence of hydrogen bromide.

It is readily apparent that the salt is obtained in hydrated form by limiting the drying process to the evaporation step alone and the product is obtained in the anhydrous form by further extending the drying process to include dehydration which is carried out at substantially elevated temperatures under the following conditions.

Evaporation of solutions containing a bromide of plutonium in either the tetravalent or the trivalent state is preferably carried out at subatmospheric pressures of the order of 10–15 mm. of hydrogen bromide. The use of moderately elevated temperatures not in excess of 100° C. and preferably a temperature of about 70° C. favorably affects both the reduction and the rate of evaporation.

In order to obtain the anhydrous product, the hydrated product residue prepared as set forth above is further heated under reduced pressure at a substantially elevated temperature of the order of between 225 and 650° C. in the presence of hydrogen bromide. However, a temperature of about 300° C. is preferred. The anhydrous compound thus produced is crystallographically identical with that prepared by the hydrobromination of the oxide in the dry state, which product is a particularly useful compound in reduction processes designed for the formation of the pure metal.

The following examples will serve as illustrations of the principles outlined above.

Example I

Tetravalent plutonium hydroxide containing 2 mg. of plutonium is dissolved in 2 cc. of concentrated (5 M) hydrogen bromide. Since this amount of hydroxide does not entirely dissolve at room temperature in the 2-cc. volume of hydrogen bromide solution, the mixture was heated to 70° C. after which solution was complete. Reduction of the plutonium from the tetravalent state to the trivalent state is evidenced by the observed color change of this solution to the purple color characteristic for solutions containing plutonium in the trivalent state.

A solution of plutonium tribromide thus obtained was evaporated to dryness in a stream of hydrogen bromide at 15 mm. pressure. The hydrated residue, which has been found by X-ray analysis to be isomorphous with the hexahydrate of neodymium tribromide, was heated gradually in a stream of hydrogen bromide at 15 mm. pressure up to a temperature of about 300° C. for a six-hour period. The anhydrous product was dull green and crystallographically identical with the tribromide of plutonium obtained by the dry preparation.

The melting point of the anhydrous product is 654±4° C. The crystal structure is orthorhombic with four molecules per unit cell. The lattice constants are: $a_1 = 12.57 \pm 0.05$ A., $a_2 = 4.11 \pm 0.03$ A., $a_3 = 0.13 \pm 0.04$ A. The calculated density is 6.69. Determinations of the space grouping and the atomic positions revealed that each plutonium atom is bounded by eight bromine atoms, the atomic distance being Pu:Br=3.08 A. The structure is the layer lattice type and it is isomorphous with the compounds $NdBr_3$ and $SmBr_3$.

The anhydrous plutonium tribromide resembles the other trihalides of plutonium in that it is also hygroscopic and on exposure to moist air forms the hexahydrate which is isomorphous with the hydrated forms of neodymium and plutonium halides. On continued exposure to moist air the compound deliquesces.

An interesting phenomenon is observed in the formation of the tribromide of plutonium in that, unless care is taken to exclude any chlorine impurity from the hydrogen bromide used in the reaction, about 10% of the halogen atoms in the crystal will be those of chlorine rather than bromine, thus producing a variation in the crystal lattice constants, such as $a_1 = 7.806$ and $a_3 = 4.302$, which is a hexagonal crystal rather than the true orthorhombic crystal structure.

*Example II.*

An aqueous solution of plutonium tribromide, prepared as above from the hydroxide, was evaporated to dryness in a stream of hydrogen bromide at 10–15 mm. pressure in the presence of a six-fold excess of ammonium bromide. When only a solid phase remained, this system was evacuated to $10^{-5}$ mm. and the temperature was gradually raised over a period of four hours to 350° C. At this latter temperature the ammonium bromide sublimed away completely. The product analyzed for 64% plutonium tribromide, 18% plutonium oxybromide, and 18% of an acid-insoluble impurity. This experiment illustrates the necessity of maintaining hydrogen bromide in the system during drying in order to prevent the hydrolysis of the tribromide of plutonium to plutonium oxybromide.

It will be understood that the process of this invention is subject to extensive modification in many respects. The foregoing disclosures of the several embodiments are illustrative only and are in nowise to be construed as limitations upon the scope of the invention as defined in the appended claims.

What is claimed is:

1. A process for the preparation of anhydrous plutonium tribromide from an aqueous acid solution of plutonium tetrabromide which comprises incorporating therein a water-soluble volatile bromide to provide additional bromide ions in sufficient excess to furnish an oxidation-reduction potential substantially more positive than —0.966 volt, evaporating the resultant plutonium tribromide to dryness in the presence of hydrogen bromide, and dehydrating the residue at an elevated temperature in the presence of hydrogen bromide.

2. The process of claim 1 wherein evaporation to dryness is carried out at a temperature between 70 and 100° C. and dehydration at from 225 to 600° C., both at subatmospheric pressure.

3. The process of claim 2 wherein the evaporation temperature is about 70° C. and the dehydration temperature about 300° C. and the hydrogen bromide pressure in both steps ranges between 10 and 15 mm.

4. A process for the preparation of anhydrous plutonium tribromide from an aqueous acid solution of plutonium tetrabromide, comprising incorporating in said aqueous solution a volatile, water-soluble bromide capable of providing additional bromide ions in sufficient excess to furnish a standard oxidation-reduction potential substantially more positive than —0.966 volt in said aqueous solution of plutonium tetrabromide, digesting the mixture, evaporating the resultant aqueous solution of plutonium tribromide in the presence of hydrogen bromide, and dehydrating the residue by heating at substantially elevated temperature in the presence of hydrogen bromide.

5. The process of claim 4 wherein the volatile water-soluble bromide is ammonium bromide.

6. The process of claim 4 wherein the volatile water-soluble bromide is hydrogen bromide.

References Cited in the file of this patent

UNITED STATES PATENTS

| 1,304,567 | Hulin | May 27, 1919 |
| 1,567,317 | Cottringer et al. | Dec. 29, 1925 |

FOREIGN PATENTS

| 32,338 | Germany | July 8, 1885 |

OTHER REFERENCES

Kleinheksel et al.: "J. A. C. S.," vol. 50, pp. 959–967, April 1928.

Seaborg et al.: "The Transuranium Elements," 1st ed., Pt. I, vol. IV–14B, pp. 743–745, 757, 758, 764, 765, 772, 773, 774; McGraw-Hill Book Co., Inc., N. Y., 1949. Noting particularly page 765 which describes a process referred to by bibliographic reference 17 as Report CK–1586 (May 1, 1944) (A–2251), pp. 7–8.

Harvey et al.: Journal of the Chemical Society, 1947 (August), pp. 1010–1021, particularly pp. 1010–11.